July 31, 1962  A. J. WYDRA  3,046,670
RADIUS GAGE
Filed June 13, 1958
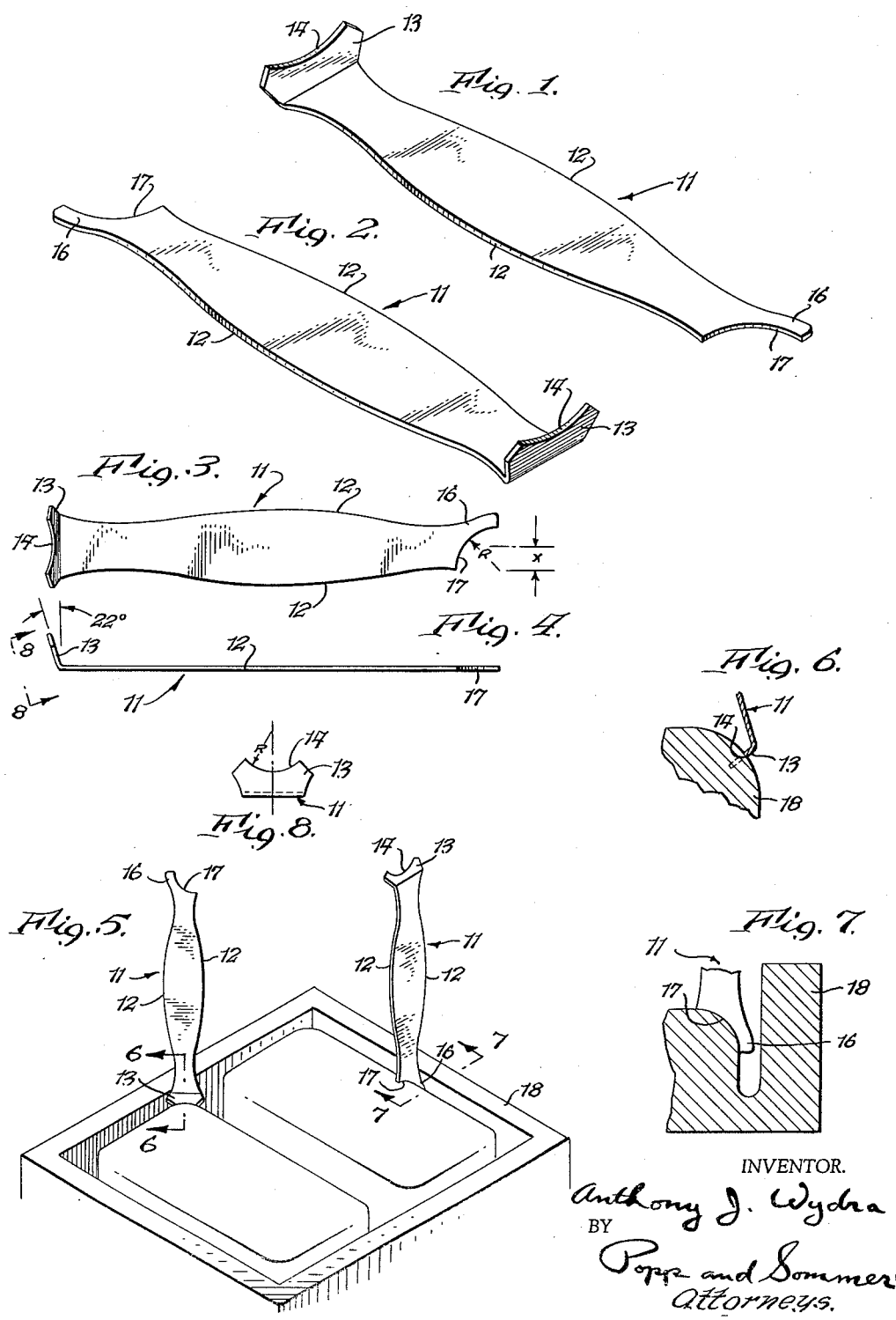
INVENTOR.
Anthony J. Wydra
BY
Popp and Sommer
Attorneys.

United States Patent Office 3,046,670
Patented July 31, 1962

3,046,670
RADIUS GAGE
Anthony J. Wydra, 1974 Delaware Ave., Buffalo, N.Y.
Filed June 13, 1958, Ser. No. 741,944
2 Claims. (Cl. 33—178)

This invention relates to an instrument generally known as a radius gage used by tool and die makers and other craftsmen for measuring or checking radii or fillets found in certain workpieces.

The development of high production techniques for metal and plastic molding has given great impetus to the tool and die making craft, with an accompanying increased demand for closer tolerances and more complicated tools and dies. In many cases, the standard gages are not usable for measuring or checking certain convex radii, as for example, where there is a lack of sufficient clearance about the radii to be measured to allow room for the gage. In such cases, which occur with increasing frequency as die structures become more complicated, it is necessary for the craftsman to lay out a special gage, a procedure which is not only time consuming, but generally extremely costly since the special gage may have no further application.

The gage of the present invention may be used for measuring most convex radii which present gages on the market cannot measure, hence saitsfies a long felt need. In addition, it may be used for measuring all the convex radii which present gages on the market can measure; hence, it is not merely an additional gage but rather is a replacement or substitute gage. Among the advantages realized by adoption of the gage of the invention, are substantial savings in labor and gage costs, coupled with great convenience in use.

The object of the present invention is to provide a gage for measuring convex radii.

A more specific object is to provide a gage for measuring convex radii which cannot be measured by gages currently in use.

A further object is to provide a gage for measuring convex radii which gage will result in substantial savings in labor and gage costs, and which affords great convenience in use.

These and further objects and features of the invention will become apparent from the following description and accompanying drawing wherein:

FIG. 1 is a perspective view of a radius gage embodying the principles of the invention;

FIG. 2 is the same but as seen from another point of view;

FIG. 3 is a plan view of same;

FIG. 4 is a side view of same;

FIG. 5 is a perspective view showing the gage of FIG. 1 in actual use;

FIG. 6 is an enlarged section view generally as seen along line 6—6 in FIG. 5;

FIG. 7 is an enlarged section view generally as seen along line 7—7 in FIG. 5; and FIG. 8 is a view as seen from line 8—8 in FIG. 4.

Referring now to the drawing, the numeral 11 identifies a radius gage embodying the principles of the invention, and which is made from a flat sheet of metal, preferably stainless steel. The gage 11 is of elongated form with curved or bowed edges 12 symmetrically arranged about the longitudinal center line, as best seen in FIG. 3.

One end of the gage 11 has a portion 13, which is bent to form an acute included angle of approximately 22° from the normal, and has a concave or quarter circle recess 14 generated by a radius R, the center of which is in a plane intersecting the longitudinal center line of the gage and bisecting the recess 14, as shown in FIG. 8.

At the other end of the gage 11, is a portion 16, having a concave or quarter circle recess 17 generated by a radius R, the center of which is offset a distance X from the longitudinal center line of the gage, as shown in FIG. 3. From an inspection of the drawings it will be seen that the quarter circle recess 17 terminates at one side edge 12 and the corresponding end edge of the gage and that the opposite side edge 12 of the member 16 is shaped to conform to the recess 17 thereby to provide an elongated thin finger adapted to enter narrow crevices of the die cavity as hereinafter described. The radii R at opposite ends of the gage are preferably, but not necessarily, the same length. The gage is made in graduated sets wherein R is increased from a minimum to a maximum in say $\frac{1}{64}''$ steps, whereby the full range of radii or fillets commonly used in tool and die work may be measured by the gages in a given set.

The gage of the invention as seen in FIG. 5 is used for measuring certain radii of a die or mold 18. The end portion 13 is employed for measuring or checking the radii at the corners of the mold form, while the end portion 16 is employed for measuring or checking the radii along the edges of the mold form. It will be noted that for these measurements the recesses 14 and 17 cannot exceed a quarter circle since otherwise they would not fit the rounding corners of the mold. This is a typical measuring operation of the gage 11, which could not be accomplished by standard gages of current use, such for example as typified by gages disclosed in Patents 867,011 or 1,825,987. These prior art gages could not be used for measuring the radii in the illustrated die or mold 18, because the die structure does not allow sufficient clearance for use of such gages. In situations like this, it is common practice for the craftsman to make a special gage or template for checking said die radii, which template may have no further use, thus resulting in a high cost to the die producer.

The gage of the present invention thus not only finds application in this and other situations wherein the prior art gages are of no utility, but may be used in all cases where the prior art gages are usable. Hence, the substantial savings in labor and gage costs, together with the great convenience afforded by the gage of the invention, should be obvious.

The foregoing description has been given in detail without thought of limitation since the inventive principles involved are capable of assuming other physical embodiments without departing from the spirit of the invention and the scope of the appended claims.

What is claimed is:

1. A radius gage comprising a substantially flat elongated metallic sheet having at one end a laterally bent portion arranged at an acute included angle to the normal and formed with an end edge recess not exceeding a quarter circle extending from one face of said sheet to the opposite face thereof and generated by a radius having a center in a plane intersecting the longitudinal center line of the gage and substantially bisecting said recess.

2. A radius gage as set forth in claim 1 wherein said angle is approximately 22°.

References Cited in the file of this patent

UNITED STATES PATENTS

| | | |
|---|---|---|
| 867,011 | Bromley | Sept. 24, 1907 |
| 1,825,987 | Witchger | Oct. 6, 1931 |
| 2,585,521 | Wandrus | Feb. 12, 1952 |

FOREIGN PATENTS

| | | |
|---|---|---|
| 439,319 | Great Britain | Dec. 4, 1935 |
| 109,876 | Sweden | Dec. 22, 1944 |